M. BARBOUR.
Improvement in Planter and Fertilizer.
No. 126,250.   Patented April 30, 1872.
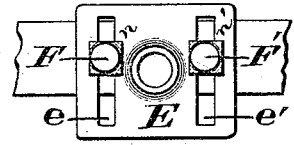
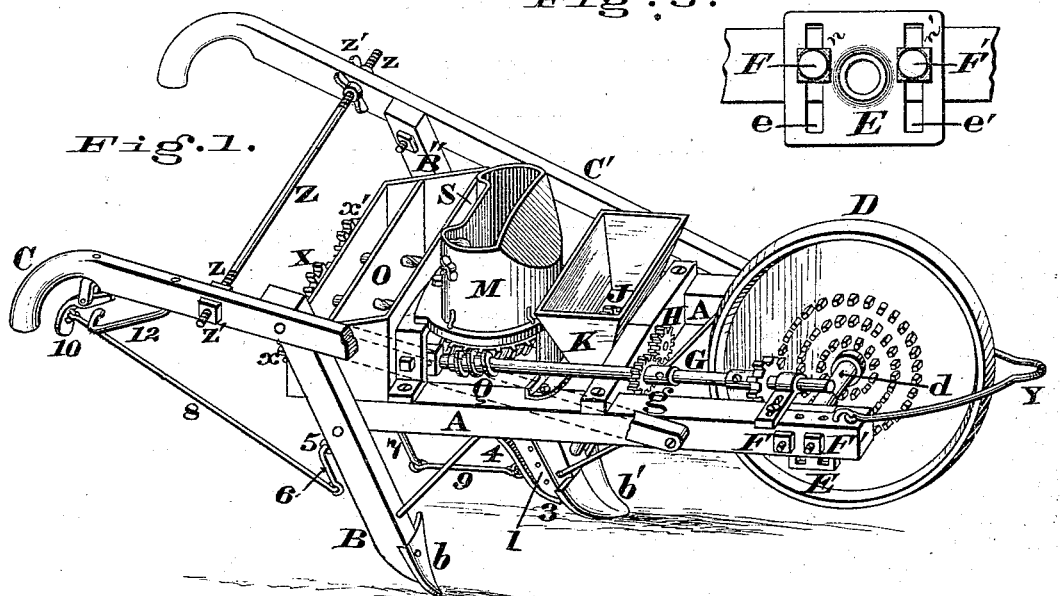
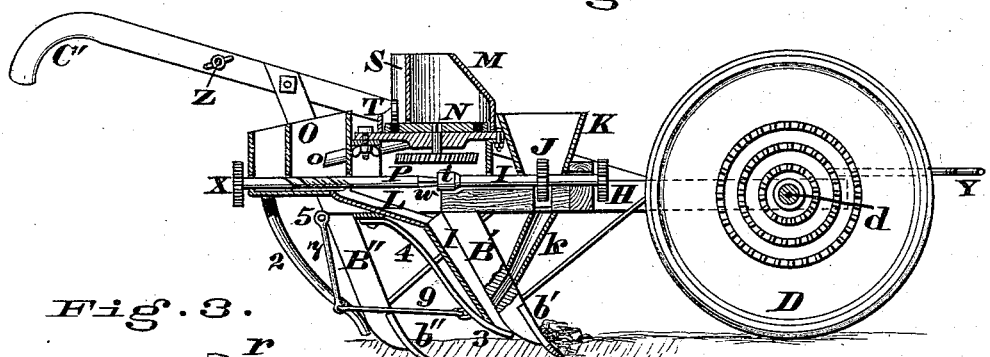
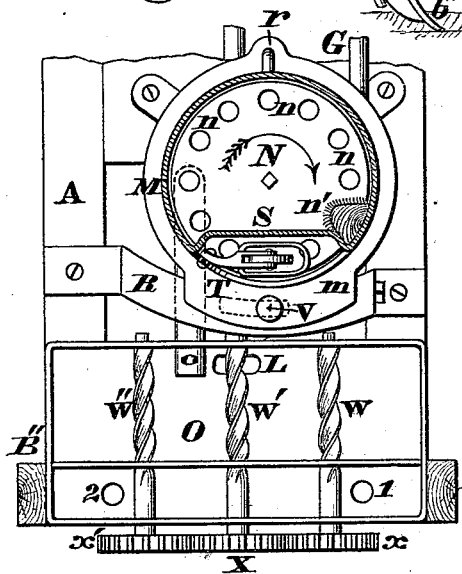
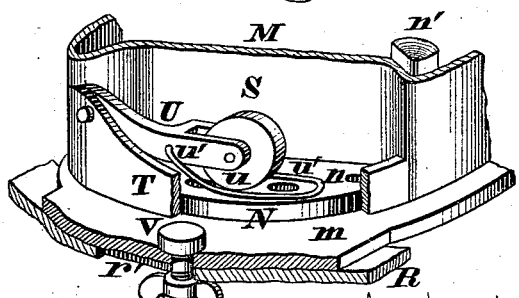

UNITED STATES PATENT OFFICE.

MATTHEW BARBOUR, OF OXFORD, OHIO.

IMPROVEMENT IN PLANTERS AND FERTILIZERS.

Specification forming part of Letters Patent No. 126,250, dated April 30, 1872.

I, MATTHEW BARBOUR, of Oxford, Butler county, Ohio, have invented a certain new "Combined Corn-Planter, Wheat-Drill, and Fertilizer," of which the following is a specification:

This invention relates to an implement which in its simplest form is adapted to be used as a combined corn-planter and fertilizer, and which, by a slight addition, can be rendered capable of being employed as a wheat-drill, the operation of distributing the fertilizing compound being all carried on at the same time with the seed planting, whether of corn or smaller grain.

Figure 1 is a perspective view of an implement embodying my improvements. Fig. 2 is a longitudinal section of the same. Fig. 3 is a horizontal section through the grain-hoppers. Fig. 4 is a section through a portion of the lower part of the corn-hopper; and Fig. 5 is a view of the adjustable boxes in which the axle of the ground-wheel is journaled, the three last views being drawn on an enlarged scale.

A represents the main frame of the implement. B B' B'' are the sheaths or standards. b b' b'' are the shares, and C C' are the handles of the same. Journaled in the forward end of the frame is a ground-wheel, D, whose shaft d is fitted in boxes, E, having slots e e' and bolts F F', which permit the vertical adjustment of said boxes upon the frame. The object of this adjustment is to set the implement in such a manner as to insure the share penetrating the ground a greater or less distance, as may be desired. The ground-wheel is provided with three distinct concentric series of teeth, with either of which engage a pinion on the front end of driving-shaft G. Driving-shaft G has a wheel, g, which gears with another one, H, the latter being secured to the counter-shaft I. This counter-shaft carries the feed-wheel J, which is located at the bottom of the hopper K, which contains the fertilizer. The quantity of fertilizing compound which is discharged from the hopper K is regulated by a gate or cut-off that may be operated from one side of the machine. After leaving the hopper the fertilizer is discharged through a spout, k. Placed in the rear of hopper K is another one, M, which is intended for the reception of corn; and the bottom m of said hopper has fitted in it a disk, N, having a series of apertures, n, in it. These apertures or cells are intended for carrying corn away from the hopper M and conducting it through opening tube o into receptacle O, and thence through spouts L l into the central furrow, whenever the disk N is rotated in the direction indicated by the arrow in Fig. 3. The rotation of this disk is effected by a wheel, P, that gears with a worm, Q, the latter being attached to driving-shaft G. The hopper M is pivoted to a frame, R, at r; and the wheel P may be thrown out of gear with the worm Q by swinging the hopper to the opposite side of the machine to that in which the shaft G is located. The hopper M is not entirely circular in its horizontal section, it being provided with a recessed portion, S, so as to permit of a portion of the feed-wheel being seen outside of said hopper. Opposite the recessed portion of the hopper is a guard or flange, T, which prevents the corn escaping from feed-wheel N. This guard has pivoted to it a gravitating-arm, U, within which is journaled a roller, u, which latter insures the corn entering the cells n at the proper moment. A curved rod, u', acts to sweep off from disk N any superfluous grain which might escape under the brush n', and to conduct such grain into one of the empty cells of the disk, and thus return it to the hopper M. V is a bolt, which, being secured to plate m and passing through a slot, r', in frame R, serves to maintain the wheel P either in or out of gear with the worm Q. Whenever it is desired to employ the implement for drilling wheat, another hopper, O, is added to the rear end of the frame A. The hopper is furnished with three spiral feeders, W W' W'', which are driven by wheels x x' that gear with a wheel, X, the latter being attached to the feeder W', which is journaled in hopper O. The forward end of this feeder W' has a socket, w, which fits over the non-circular termination i of shaft I. The sheaths B B'' are attached at top to the handles, which are connected by a rod, Z, having screw-threaded portions z and nuts z'. This provision of the screw-threaded rod and nuts permits the sheaths to be separated at top so as to throw the shares b b'' toward one another for the purpose of covering corn; but when it is desired to cover wheat the sheaths are compressed at top, so as to cause a much greater separation of the shares. 1 and 2 are grain-tubes leading from the hopper O to the rear of sheaths B B'. 3 is a gate at the bottom of grain-spout 1, and said gate is maintained in its closed condition by a spring-bar, 4. The gate is opened by an arrangement of rock-shaft 5, arms 6 and 7, rods 8 and 9, and trigger 10. The trigger is rendered inoperative, whenever necessary, by a catch, 12, pivoted to the handle C. Y is the clevis.

Claims.

I claim as my invention—

1. The boxes E E, slotted as described, and provided with bearings for the reception of shaft $d$ between the beams A A to adjust the wheel D, as and for the purpose set forth.

2. The deflecting-rod $w'$, in combination with the recessed hopper M, gravitating-arm U, roller $u$, flange T, and perforated disk N, arranged substantially as described.

In testimony of which invention I hereunto set my hand.

MATTHEW BARBOUR.

Witnesses:
GEO. H. KNIGHT,
JAMES H. LAYMAN.